(12) United States Patent
Capozzi et al.

(10) Patent No.: US 6,755,378 B2
(45) Date of Patent: Jun. 29, 2004

(54) SYSTEM AND METHOD FOR CONTROLLING A SPACE-BORNE PROPULSION SYSTEM

(75) Inventors: Ronald Capozzi, Little Silver, NJ (US); Nicholas Chilelli, Bordentown, NJ (US); Susan Peyton, Cranbury, NJ (US); Michael Pritchard, Yardley, PA (US); Henry White, Manalapan, NJ (US); Emmett Hume, Wrightstown, PA (US)

(73) Assignee: Sesa Americom, Inc., Princeton, NJ (US)

( * ) Notice: Subject to any disclaimer, the term of this patent is extended or adjusted under 35 U.S.C. 154(b) by 152 days.

(21) Appl. No.: 09/996,721

(22) Filed: Nov. 30, 2001

(65) Prior Publication Data

US 2004/0035982 A1 Feb. 26, 2004

(51) Int. Cl.$^7$ ................................................ B64G 1/22
(52) U.S. Cl. ................ 244/172; 244/135 C; 244/158 R
(58) Field of Search .......................... 60/259, 267, 233, 60/243; 244/164, 169, 172, 96, 99, 135 B, 135 C

(56) References Cited

U.S. PATENT DOCUMENTS

| | | | | |
|---|---|---|---|---|
| 2,925,712 | A | * 2/1960 | Johnson et al. | 60/785 |
| 3,286,882 | A | * 11/1966 | Tripp | 222/61 |
| 3,806,064 | A | * 4/1974 | Parilla | 244/169 |
| 3,846,984 | A | * 11/1974 | Siegel | 60/509 |
| 3,855,865 | A | * 12/1974 | Kishimoto et al. | 374/159 |
| 3,968,348 | A | * 7/1976 | Stanfield | 219/535 |
| 4,089,174 | A | * 5/1978 | Posnansky | 418/83 |
| 4,281,238 | A | * 7/1981 | Noma et al. | 219/535 |
| 4,329,569 | A | * 5/1982 | Hjortsberg et al. | 219/535 |
| 4,880,185 | A | * 11/1989 | Apfel | 244/135 B |
| 4,934,330 | A | * 6/1990 | Lindsay | 123/557 |
| 5,027,597 | A | * 7/1991 | Soeffker et al. | 244/172 |
| 5,064,153 | A | * 11/1991 | Gindre et al. | 137/154 |
| 5,071,093 | A | * 12/1991 | Perdu | 137/209 |
| 5,207,399 | A | * 5/1993 | Risberg et al. | 137/340 |
| 5,251,852 | A | * 10/1993 | Pulkowski et al. | 244/135 C |
| 5,417,049 | A | * 5/1995 | Sackheim et al. | 244/169 |
| 5,572,865 | A | * 11/1996 | Sackheim et al. | 60/260 |
| 5,714,738 | A | * 2/1998 | Hauschulz et al. | 219/535 |
| 5,823,478 | A | * 10/1998 | Dunn | 244/135 R |
| 5,880,356 | A | * 3/1999 | Delepierre-Massue et al. | 73/37 |
| 5,934,621 | A | * 8/1999 | Kent et al. | 244/135 R |
| 5,961,074 | A | * 10/1999 | Dunn | 244/135 R |
| 6,024,328 | A | * 2/2000 | Ellison | 244/135 R |
| 6,073,445 | A | * 6/2000 | Johnson | 415/202 |
| 6,231,008 | B1 | * 5/2001 | Schwarting | 244/135 R |
| 6,263,665 | B1 | * 7/2001 | Ketsdever et al. | 60/203.1 |
| 6,380,523 | B1 | * 4/2002 | Jones, Sr. | 219/528 |
| 6,405,532 | B1 | * 6/2002 | Shahinpoor et al. | 60/512 |
| 6,550,717 | B1 | * 4/2003 | MacCready et al. | 244/13 |

FOREIGN PATENT DOCUMENTS

GB  2051246  * 4/1981  ............. F04F/1/06

OTHER PUBLICATIONS

Stansbery et al "Calculations of Hydrazine Thruster Contamination for the Genesis Solar Wind Collectors", p. 1.*

* cited by examiner

*Primary Examiner*—Charles T. Jordan
*Assistant Examiner*—Stephen A Holzen
(74) *Attorney, Agent, or Firm*—Fleshner & Kim, LLP

(57) ABSTRACT

A system and method for controlling a propulsion system of a space-borne object (e.g., a satellite) is based on the principle that temperature in the propellant tank of the propulsion system is directly proportional to the pressure therein. Accordingly, when pressure drops, the system and method maintains a desired pressure in the propellant tank by heating the tank. The amount of heat to be applied is determined based on an evaluation of thruster performance data collected during satellite test maneuvers. Heating of the tank may be coupled with the introduction of helium gas to provide a two-pronged approach for maintaining tank pressure. Alternatively, the helium gas may itself be heated prior to its introduction into the propellant tank. By maintaining a desired tank pressure, efficient performance of the satellite thrusters is assured.

45 Claims, 6 Drawing Sheets

SYSTEM AND METHOD FOR CONTROLLING A SPACE-BORNE PROPULSION SYSTEM

BACKGROUND OF THE INVENTION

1. Field of the Invention

This invention generally relates to propulsion systems which operate in a reduced-gravity environment, and more particularly to a system and method for controlling the propulsion system of a spacecraft to achieve a desired position and/or orientation.

2. Description of the Related Art

As the space programs of developed countries mature, satellites and other forms of spacecraft become more widely deployed. The extent of their use is largely driven by commercial demand. For example, the vast communications needs of the modern world have made geosynchronous satellites the most common manmade object in space today. One satellite of this type is the A2100 spacecraft manufactured by Lockheed Martin. The A2100 offers Ka-band/broadband services, fixed satellite services in a hybrid Ku-C-band payload configuration, and high-power direct broadcast services using the Ku-band frequency spectrum among others. Because of its versatility, the A2100 is often the satellite of choice by telecommunications providers.

In order to attain a desired orbital position or orientation (e.g., attitude), many forms of modern spacecraft are equipped with propulsion systems. These systems typically use liquid propellants to fuel an arrangement of thrusters on the spacecraft body. Liquid propellants are preferable because their flow into the thrusters can be regulated using valves and thus activation of the thrusters can be controlled with relative ease and precision.

As shown in FIG. 1, liquid propellant 1 is typically housed within a spherical tank 2 which is made of titanium for high strength and low mass and which is large enough to hold one hundred kilograms or more of, for example, hydrazine. From the tank, a system of plumbing 3 carries the propellant (which in this example is called mono-propellant since there is only one liquid) through filters and valves. When the valves are opened, hydrazine squirts onto a hot catalyst, which provokes the hydrazine to decompose rapidly, releasing heat and expanding in the process. The hot, expanding gases force themselves out through a controlled number of thrusters 4. The act of expelling mass in this manner creates thrust which causes the spacecraft to achieve a desired orbital position and/or orientation.

In order to ensure propellant properly flows into the thrusters in a reduced-gravity environment, the propellant tank must be pressurized. In a mono-propellant system such as described above, a flexible diaphragm 5 is used within the tank to separate the propellant from an area 6 (commonly referred to as ullage) that is pressurized with helium. The introduction of helium into the tank keeps the propellant pressed against an outlet, thereby providing the force required to drive the propellant through the plumbing when the valves open. In most mono-propellant systems, a small tank of helium 7 is used to re-pressurize the ullage as necessary to ensure the proper flow of propellant over time.

Some spacecraft are fueled with two liquid propellants held within separate tanks. These so-called bi-propellant systems manage their fuel loads differently. For example, both propellants are pressurized with helium supplied at a regulated pressure from a dedicated high-pressure helium tank. Unlike mono-propellant systems, no diaphragm is used to separate the propellants from the helium. Instead, each tank is equipped with a surface tension management device which causes propellant to flow during thruster firing. U.S. Pat. No. 5,251,852 discloses a bi-propellant system of this type.

Conventional propulsion systems have proven to be costly to operate and prone to failure. The use of helium to re-pressurize the propellant tanks, for example, has proven to be risky. Conventional systems have also demonstrated slow response times which have made them unreliable, especially over long-term use.

In view of the foregoing considerations, it is clear that there is a need for an improved system and method for controlling a propulsion system, and more specifically one which does so more accurately, more cost effectively, and with lower risk compared with conventional systems.

SUMMARY OF THE INVENTION

The present invention is an improved method for controlling a propulsion system of a space-borne object (e.g., a satellite) more accurately, more cost effectively and with lower risk compared with conventional systems. The method is based on the principle that temperature in the propellant tank is directly proportional to the pressure therein. This pressure, in turn, greatly influences the performance efficiency of the propulsion system.

One problem the invention addresses is low pressure in the propellant tank. When deployed in space, pressure in this tank tends to wane over time and thus the performance of the propulsion system commensurately becomes affected. The system and method of the present invention offsets these effects by preventing the tank pressure from falling below a certain level, thereby ensuring that the propulsion system will be maintained at desired performance and efficiency level. In accordance with one embodiment, the pressure of the propellant tank is measured and then compared to a predetermined criteria. When determined to be insufficiently low, the pressure in the propellant tank is increased by effecting a temperature increase in the tank. The temperature increase may be accomplished through a heater which is mounted on or proximate to the propellant tank and which is operated either automatically under control of an on-board processor or manually through commands transmitted from a ground station. Preferably, the temperature is increased by an amount that will re-pressurize the tank back to a level that will ensure proper functioning of the propulsion system.

In accordance with other embodiments of the invention, thruster performance data other than tank pressure is monitored from the satellite during a test maneuver. This thruster performance data includes any one or more of thruster on-times, power level of a power conditioning unit (PCU), and temperature of the propellant tank. This data is then evaluated to provide an indication of the tank pressure and thus whether re-pressurization is warranted through a temperature increase. If desired, the re-pressurization may be effected through the combined approach of increasing the temperature of the propellant tank and introducing helium gas therein.

In accordance with still another embodiment of the invention, the temperature of the propellant tank is raised, first, by heating the helium gas and, then, by introducing the heated gas into the propellant tank by an amount that will achieve a desired pressure increase. By re-pressurizing the propellant tank in any of the above ways, spacecraft propulsion systems will be assured of consisting operating with a desired performance efficiency.

DESCRIPTION OF THE PREFERRED EMBODIMENTS

The present invention is a system and method for controlling a propulsion system of a spacecraft. The spacecraft may be any type of space-borne object including geosynchronous and non-geosynchronous satellites, space stations, probes, space shuttles and planes, or any other object whose position and/or orientation is desired to be maintained for achieving a particular purpose. For illustrative purposes, the remainder of the discussion will focus on the propulsion system of a geosynchronous satellite equipped with a monopropellant propulsion system, such as the A2100 satellite. Those skilled in the art can appreciate, however, that the invention may also be applied to multiple propellant systems.

Figure 1:
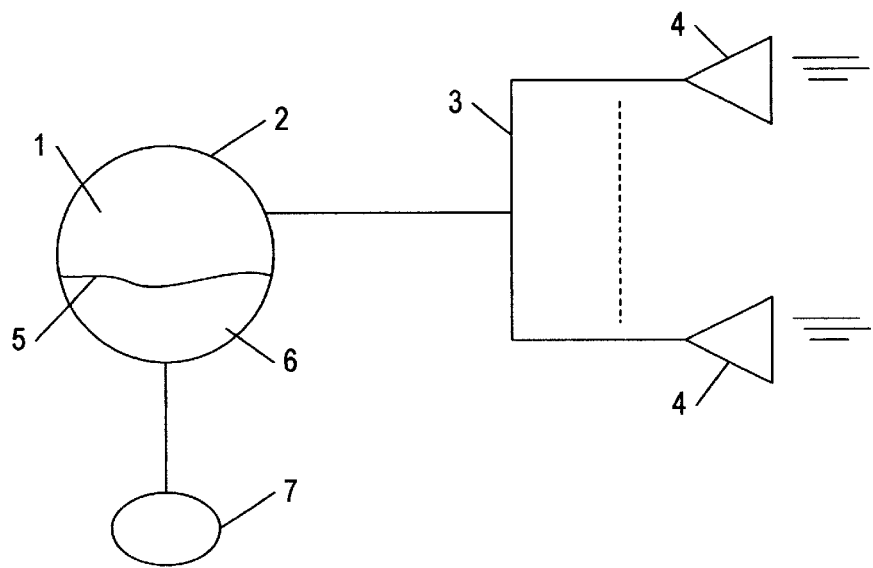
FIG. 1 is a diagram of a spacecraft equipped with a propulsion system.
Figure 2:
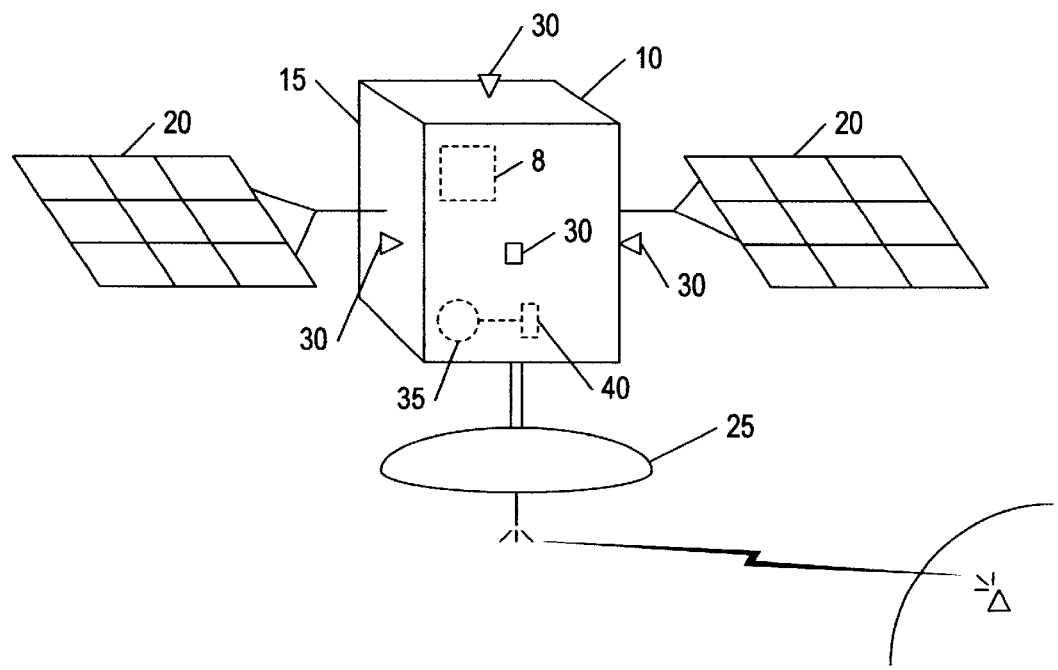
FIG. 2 is a diagram of an exemplary type of spacecraft whose propulsion system may be controlled in accordance with the system and method of the present invention.

FIG. 2 is a diagram of a typical three-axis stabilized satellite 10 that circles the Earth in a predetermined orbit. This satellite includes a body 15, a power source 20, an antenna 25, and a propulsion system containing a plurality of arcjet thrusters 30 arranged in a predetermined configuration. The body contains hardware and/or software for performing intended (e.g., telecommunications) services, the power source includes an array of solar panels, and the antenna communicates with one or more ground stations on the Earth. In addition to the thrusters, the propulsion system includes a propellant tank 35 filled with at least one liquid propellant (e.g., hydrazine) and a tank 40 for intermittently re-pressurizing the propellant tank. The re-pressurization fluid may be any gas or liquid with helium being preferable. The thrusters may be arranged either symmetrically or asymmetrically on the satellite body, and preferably is selected to minimize attitude disturbances. For illustrative purposes, the thrusters are shown as being in a symmetrical configuration.

When deployed in space, the pressure in the propellant tank will tend decrease over time because of various external and other influences. This reduced pressure will affect the performance and efficiency of the thrusters. For example, insufficient pressure in the propellant tank will often translate into a low thruster output or even a mis-firing of the thrusters. When this condition arises, the spacecraft will be unable to accurately achieve a desired orientation or orbital position, which may compromise mission goals. It is therefore clear that the pressure in the propellant tank is directly proportional to the operational efficiency of the propulsion system and thus the overall performance of the satellite.

The present invention solves this and other problems by providing a system and method which prevents pressure in the propellant tank from falling below a predetermined value, thereby ensuring that the propulsion system and thus the spacecraft will be maintained at an acceptable performance and efficiency level. Preferably, the method is periodically performed to ensure that the system operates at this level at all times throughout the operational life of the satellite.

In accordance with at least one embodiment, the invention effects this control indirectly, first, by monitoring a drop in pressure in the propellant tank and, then, by increasing tank pressure to a desired level. The invention increases tank pressure not solely by introducing re-pressurizing helium gas into the propellant tank as is performed by conventional methods, but rather by effecting a temperature change in the propellant tank which will produce a corresponding increase in pressure. Controlling tank temperature in this manner provides a cost effective, low risk approach that outperforms conventional methods that rely solely on supplemental (e.g., helium) tanks for re-pressurization.

Taking the spacecraft shown in FIG. 2 as an example, the control method of the present invention is performed through the cooperation of an on-board processing system 8, which is responsive to various sensors positioned throughout the satellite, and a ground station 9 on the Earth's surface. The sensors include tank pressure transducers and thermal sensors which may be of any conventional type, e.g., those made by Tabor. The processing system is driven by control software and may be computational and part of the satellite design. The ground station contains a computer system and/or technical personnel for interacting with the satellite.

Figure 3:
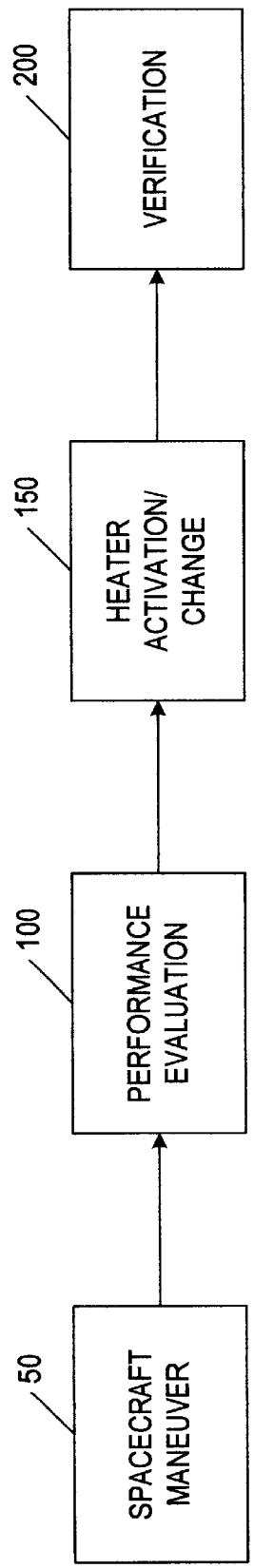
FIG. 3 is a block diagram showing steps included in a preferred embodiment of the method of the present invention.

Referring to FIG. 3, a preferred embodiment of the method of the present invention includes four steps: a spacecraft maneuver step 50, a performance evaluation step 100, a heater change and/or activation step 150, and a verification step 200.

Spacecraft Maneuver

In the spacecraft maneuver step, the satellite is controlled to undergo one or more maneuvers. This may involve selectively activating the thrusters of the satellite under control of the processing system. The thruster firing may be controlled, for example, according to a predetermined test pattern which may be run periodically in response to commands from the ground station. Alternatively, the test pattern may be programmed into the processing system of the satellite so that it is automatically performed according to a predetermined schedule.

In performing the method of the invention, any number of conventional test patterns may be used. Preferably, the test pattern is one which controls satellite positioning and thruster on-times in a way that will allow a propellant tank pressure determination to be made in accordance with subsequent steps of the method. In addition to test maneuvers, the method of the present invention may be performed when the satellite is moved other than for test purposes, for example, during a mission-based orbital adjustment.

Performance Evaluation

Figure 4:
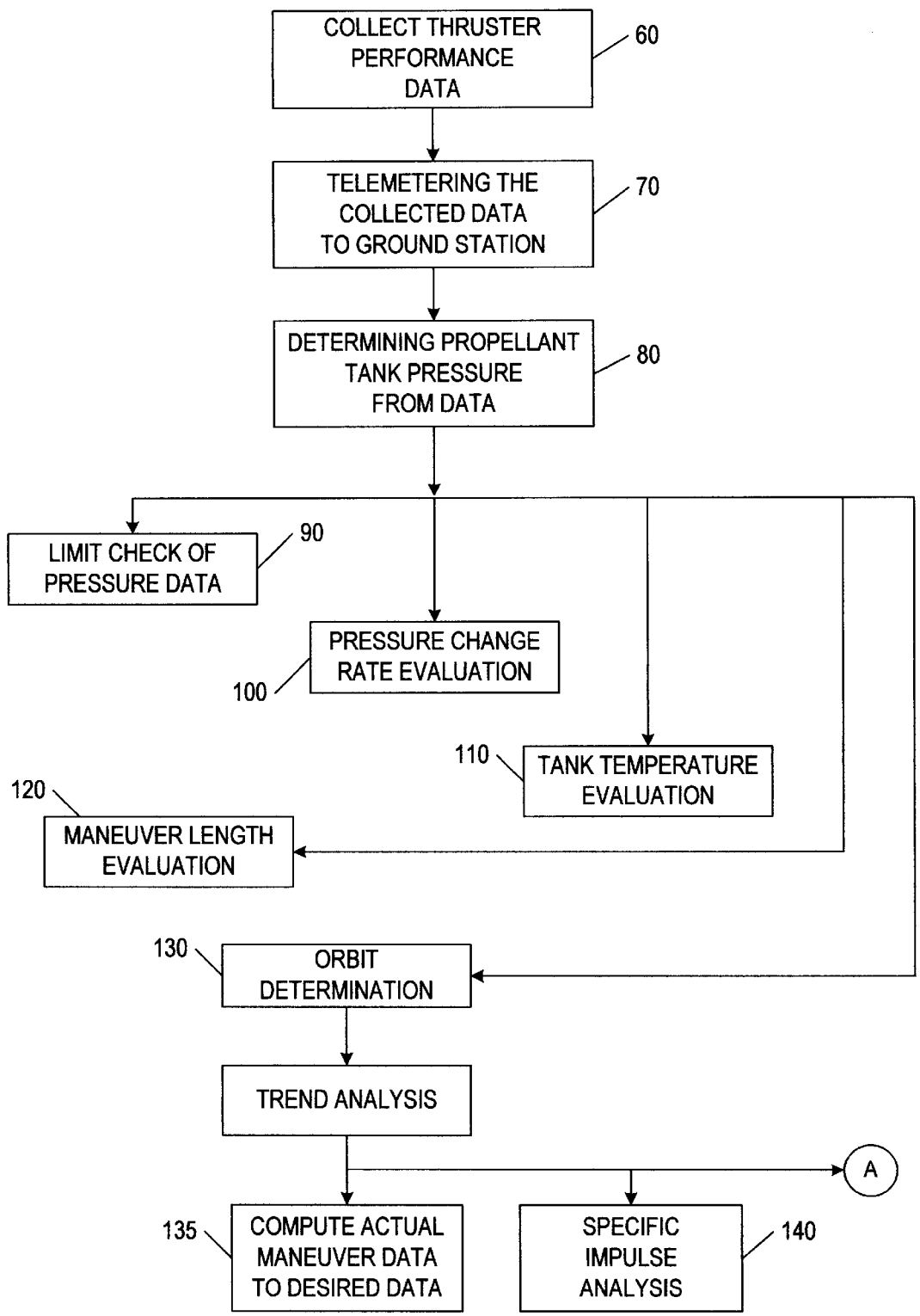
FIG. 4 is a block diagram showing steps included in a performance evaluation phase of the method of the present invention.

In the performance evaluation step, discussed with reference to FIG. 4, the performance of the satellite propulsion system is monitored during the maneuvering step discussed above. This monitoring process includes measuring and collecting thruster performance data which may include one or more of thruster on-times, the power level of the power conditioning unit (PCU), propellant (e.g., hydrazine) tank pressure, and propellant tank temperature. (Block 60). Pressure, temperature, and other sensors are dispersed throughout the satellite for monitoring this data. As will be explained in greater detail below, the data may be used to determine the relative performance of the propulsion system and thus the maneuver efficiency of the satellite if changes in the tank temperature are made. (This relative performance is determined, for example, by comparing of the satellite telemetry data to orbit determination data as is performed in subsequent steps.)

After the thruster performance data is acquired, the processing system of the satellite telemeters the data to the ground station where it is electronically archived. (Block 70). An evaluation is then performed to determine, for example, the pressure in the propellant tank based on the archived data. (Block 80). This evaluation may be performed in various ways which may include one or more of the following.

According to one aspect of the evaluation step of the present invention, pressure data obtained from transducers on the propellant tank is compared with the manufacturer's limit on the lowest recommended pressure that should reside in the propellant tank (Block 90). Those skilled in the art can appreciate that this lower limit may vary among designs and manufacturers. As the pressure approaches the lower limit, a critical decision point is reached. Here, it must be determined whether the propellant tank should be re-pressurized in order to offset any impending compromise in thruster performance. This decision may be made by a ground station analyst or automatically by a computer program based on a predetermined criteria. If desired, the limit check may be set to some desired point above the manufacturer's lower limit in order to maintain a desired enhanced level of performance of the propulsion system.

According to another aspect of the evaluation step of the present invention, the rate of change of pressure in the propellant tank is determined from the data derived from the pressure transducers. (Block 100). This rate maybe determined over the full time of the satellite maneuver or over some shortened period thereof. Typically, rate information of this type is not entirely linear with time, but often a downward trend is observed which may be relied on to conclude that tank re-pressurization is needed. For example, the detected pressure change rate may be compared to a desired change rate or other information and re-pressurization may be performed if a significant enough deviation occurs.

According to another aspect of the evaluation step of the present invention, the temperature of the propellant tank (derived from an on-board temperature sensor) is compared to the minimum and/or maximum limits of a heater for the propellant tank, discussed in greater detail below. (Block 110). If the measured tank temperature is approaching, for example, the lower limit, the tank may be heated in accordance with step 150 of the invention.

Preferably, the ground station will place warning limits on the telemetered temperature data. For example, there may be two levels of limits in place for temperature control: a "red" limit and a "yellow" limit. The red limit may be used, for example, when a specific action needs to be taken. The yellow limit is a warning limit which may be a predetermined number of degrees (e.g., 3 to 5° C.) away from the red limit to give advanced warning that the temperature (or heater) limits are being approached. A red limit may be set at 20° C. and a yellow limit at 25° C.

According to another aspect of the evaluation step of the present invention, a maneuver length analysis is performed based on the on-time of at least one thruster of the satellite. This analysis may involve a comparison of a thruster on-time length as commanded by a flight computer to a measured and then telemetered thruster on-time length. (Block 120). The comparison may then be relied on to provide an indication of efficiency loss, which is minimized in accordance with the present invention.

The maneuver length analysis may begin by transmitting to the satellite a commanded number of seconds of on-time for one or more Delta-V thrusters. The actual length of time each thruster is on is accumulated in a buffer and telemetered to the ground station. A comparison is then performed to determine differences between the commanded and actual times and an efficiency determination is derived therefrom. This time difference may be used as a basis for controlling pressure in the propellant tank in accordance with the present invention. For example, if the actual time is off by some predetermined amount, this suggests that the propellant tank pressure is undervalued. The method of the present invention may then be used to restore the pressure to an acceptable level.

According to another aspect of the evaluation step of the present invention, an orbit determination step is performed to identify the orbital position which the satellite should have achieved as a result of the test firing of the thrusters during the maneuvering step. (Block 130). The orbit determination is calculated using a separate set of standard software tools which employ conventional orbit-determination algorithms known to those skilled in the art.

A trend evaluation step is then performed. In this step, the efficiency of the propulsion system (e.g., thruster operation) as determined from the telemetered data is compared against a performance level and efficiency that was desired to be achieved during the maneuvers. This may involve, for example, comparing the actual post-maneuver position of the satellite with the desired position as derived from the orbit determination calculations. (Block 135). If the results are different from those expected, for example, to within predetermined tolerances, a temperature adjustment in accordance with the present invention may be performed to increase the efficiency of the propulsion system.

The trend evaluation may also involve a determination of whether an optimum specific impulse of the propulsion system was achieved during the maneuvering step. (Block 140). The specific impulse corresponds to the exhaust velocity of the propellant expelled from the thruster divided by the gravitational acceleration. In theory, specific impulse is a design parameter but in practice it may be measured as performance parameter from the orbit determination data. The optimum specific impulse is a numerical value which is often system specific or set by an engineer which provides an indication of the efficiency of the propulsion system.

Figure 5:
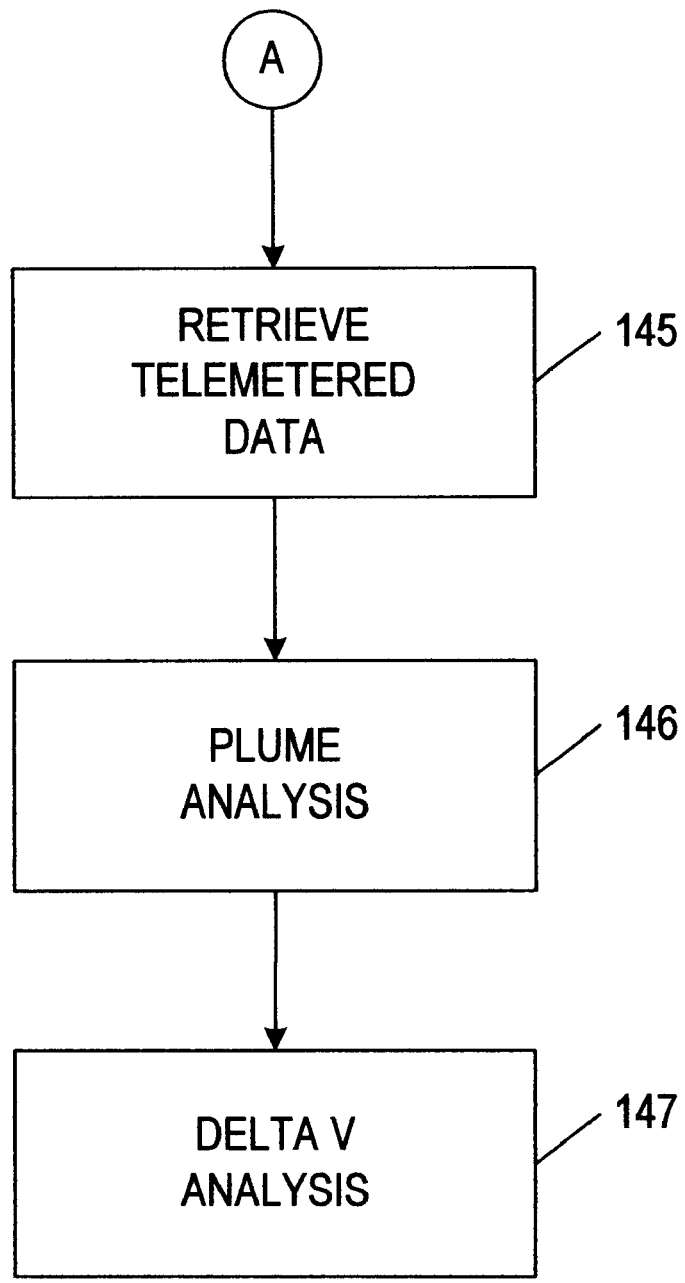
FIG. 5 is a block diagram showing additional steps included in the performance evaluation phase of the method of the present invention.

A trend evaluation of one or more station-keeping thrusters of the propulsion system may include the following steps. Referring to FIG. 5, first, the telemetered and now-archived thruster performance data is electronically retrieved at the ground station. (Block 145). Next, a plume analysis is performed. This analysis provides an indication of an equivalent efficiency loss resulting from particles of gas bombarding the solar array, which is close to the thrusters. (Block 146). A large component of the efficiency loss may be attributable to plume. The plume analysis may be performed manually or by computer in accordance with conventional standardized-loss techniques. Since plume is an undesirable effect, it is measured to provide an indication of an efficiency loss produced as a result of, for example, a loss of pressure in the propellant tank.

Next, a velocity increment (Delta V) analysis is performed to determine the speed increase which resulted from thruster activation during the maneuver step of the invention.(Block 147). The velocity increment corresponds to a vector value having magnitude and direction components which may be relied on to provide an indication of thruster performance. This, in turn, may be equated to efficiency.

The Delta V analysis performed in accordance with the present invention involves comparing the actual velocity increment that was achieved by the maneuver step with a desired velocity increment. The desired velocity increment is determined from the orbit determination data that was calculated in a previous step of the method. (In this analysis, any efficiency loss that cannot be accounted for due to deterministic effects may be attributed to plume loss.) Optimization of the Delta V results will follow from an optimization of the specific impulse, the latter of which will be achieved by effecting the temperature change in accordance with the present invention.

The trend evaluation may also involve tracking the actual pressure and temperature in the hydrazine and/or helium tanks over a period of time, which, for example, may be 6 months to a year. It is noted that the pressure rate change may serve as a basis for determining a mass rate change in the tank, as derived from the equation $PV=nRT$ where pressure (P) decreasing with decreasing n and temperature (T). Once determined, these values are compared to the pressure (or temperature) limits and/or the rate of change of the pressure (or temperature) for the propellant tank as provided by the manufacturer. In performing this comparison, it is undesirable to approach the manufacturer's lower limits for either pressure or temperature, as propulsion system performance may be expected to wane under these conditions. One non-limiting example of a manufacturer's lower pressure limit is 220 psia.

If the manufacturer's limits are being approached, various measures may be taken to offset this condition. One way involves re-pressurizing the propellant tank with helium This represents the conventional approach which has proven to be risky and undesirable under certain conditions.

A second way corresponds to a preferred embodiment of the method of the present invention. This involves indirectly re-pressurizing the propellant tank by increasing its temperature, within any constraints that maybe placed on the tank such as manufacturer's limits. The equation $PV=nRT$ governs the physics underlying this approach. As those skilled in the art can appreciate, in the foregoing equation pressure (P) and temperature (T) are directly proportional to one another. Thus, increasing the temperature of the propellant tank will result in a corresponding pressure increase, which, in turn, will raise or maintain the performance efficiency of the satellite propulsion system to a desired level. Thus, while the helium-based approach and the approach taken by the invention will both increase tank pressure to a level that will restore acceptable performance of the propulsion system, only the method of the present invention will bring about these results in the most cost-efficient and risk-averse manner.

Heater Control

The thruster performance evaluation step of the invention is performed to determine whether pressure in the propellant tank is insufficiently low for purposes of ensuring efficient satellite propulsion operation. If it is determined that the pressure is insufficiently low, the method of the present invention includes a number of steps for heating the propellant tank as a way of increasing pressure to an acceptable level.

Figure 6:
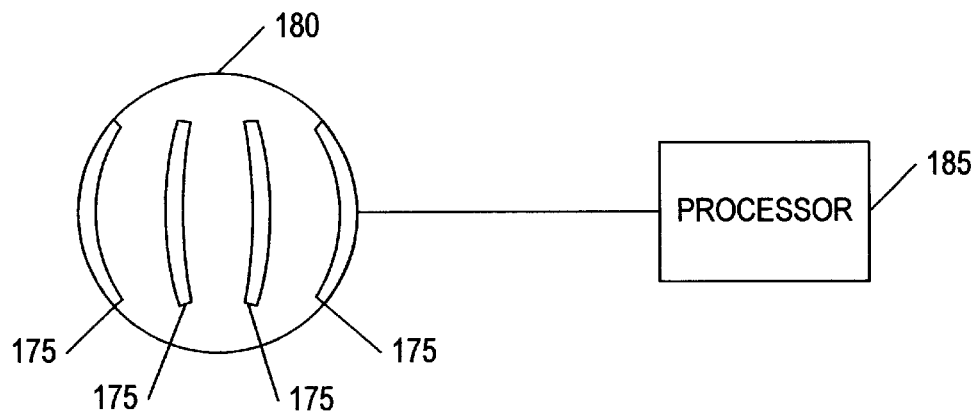
FIG. 6 is a block diagram of an exemplary type of heater that may be used for heating a propulsion system propellant tank in accordance with the present invention.

In accordance with one embodiment of the invention, the propellant tank is heated by a heater mounted on the external wall of the tank. Such a heater may be of any type conventional known and adapted for satellite operation. For example, as shown in FIG. 6, the heater may take the form of a plurality of rectangular strips 175 that are longitudinally oriented and equally spaced around the tank 180. Heating is then effected by a resistive element to which a voltage is applied. The heater is controlled by the processing unit 185, for example, in accordance with control signals uplinked to the satellite from the ground station. Control of the heater may be effected in any number of ways. One way involves adjusting the heater on/off set points in association with the heater duty cycle in the manner described below.

Figure 7:
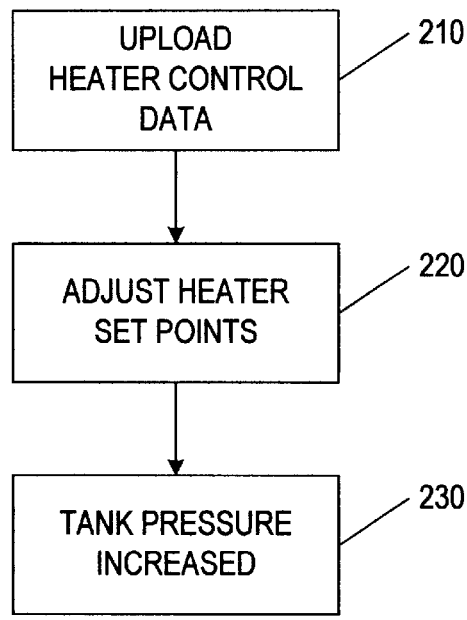
FIG. 7 is a diagram showing steps included in a heater change phase of the method of the present invention.

Referring to FIG. 7, after the aforementioned information has been determined, the ground station uploads data to the satellite for changing the tank heater on/off set points. (Block 210). This uploading step may be performed autonomously or by controller intervention. Once received, the processing system of the satellite adjusts the heater on/off set points to achieve a desired temperature within the tanks. (Block 220). The set points are calculated based on the $PV=nRT$ equation referenced earlier and a desired tank pressure, i.e, temperature set points are given so that the propellant tank pressure will increase enough to achieve the desired pressure, which corresponds to a desired efficiency of the propulsion system. The desired pressure is selected based on the specification limits of the thruster(s) as determined by its qualification testing. (Block 230).

Verification

After the heater control step, the method of the present invention confirms whether the intended adjustments have been made. This involves determining whether at least the following activities have been performed in response to the uploaded data: (1) whether re-pressurization has occurred with the required squib firing completed successfully, and (2) whether the heater control limits have been increased with the expected positive performance, with no negative impact to the adjacent equipment or violation of other constraints (e.g., temperature of the helium tank, nearby boxes, overall temperature of the satellite, etc.). Confirmation of re-pressurization may be provided based on a specific telemetry point indicating that status. As far as confirmation of the heater control limits are concerned, a heater cycling/duty cycle increase may be relied upon.

If the heater is set too high as determined from downlink feedback data, set points for a temperature decrease may be uploaded from the ground station subject preferably to an analyst's independent review of the data. Verification of the temperature decrease may be performed.

Because it is a performance increase option at higher pressures, and because an analyst is required to verify that this is in fact the case, this step of the method is preferably not automated. The temperature decrease requirements are somewhat subjective and inaccuracies or inconsistencies in the observations may not lend the temperature decrease activity to an automated implementation with current telemetry designs. The requirement parameters may be supplied to an automated upload system, however, if this is implemented and desired. A quiescent step is then performed. This involves continued monitoring.

The foregoing information, thus, provides feedback that may enable, for example, the ground station to confirm that a desired tank pressure has been effected. This will result in maintaining proper functioning of the propulsion system of the satellite throughout its useful life.

Additional Embodiments

Another embodiment of the method of the present invention re-pressurizes the propellant tank by combining the heating approach of the invention with the introduction of helium gas into the tank. This embodiment includes the following steps.

Upon confirmation that the heater limits have been appropriately increased, it is determined whether there is sufficient helium in the helium tank to augment hydrazine tank pressure. If so, calculations are performed to determine the amount of time to open the latch valve of the helium tank. These calculations are based on the expected flow rate and pressure flow of helium following the latch valve opening. The amount of time the latch should be left open is determined based on the specific design of the satellite and are known to those skilled in the art. Parameters such as propulsion tank orificing, lines, and hydrazine tank inlet may be taken into consideration as well as others. Pressure sensors may be used to determine the length of time the latch valve has been left open.

Based on the re-pressurization data, the estimated time to leave the valve open will then be determined prior to re-pressurization. The re-pressurization data will then be monitored as the values are controlled. Based on the determined temperatures, pressures, and/or the data from pervious similar re-pressurization episodes, an estimate of how, when, and how long to leave the valve open may be determined.

Next, various actions are scheduled which may include opening the valve for a short time longer to allow more helium into the propellant tank. Alternatively, no additional action may be scheduled.

Figure 8:
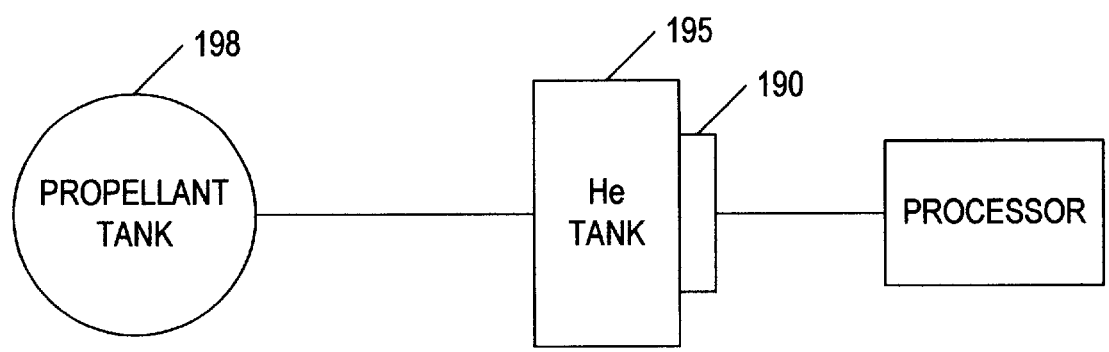
FIG. 8 is a diagram showing how re-pressurization of a propellant tank may be effected in accordance with another embodiment of the system and method of the present invention.

Another embodiment of the method of the present invention involves heating the helium gas to be introduced into the propellant tank. Referring to FIG. 8, this may be accomplished by placing a heater 190 on the helium tank 195, and then causing the heated helium gas to flow into the propellant tank 198. Control signals for operating the helium gas tank heater may be similar to those described above for the propellant tank heater, and a similar verification process may be performed.

Other modifications and variations to the invention will be apparent to those skilled in the art from the foregoing disclosure. Thus, while only certain embodiments of the invention have been specifically described herein, it will be apparent that numerous modifications may be made thereto without departing from the spirit and scope of the invention.

We claim:

1. A method for controlling a propulsion system of a spacecraft, said propulsion system including a propellant tank connected to at least one thruster, said method comprising:

measuring at least one thruster performance parameter;

evaluating said at least one thruster performance parameter to determine an indication of pressure in said propellant tank; and increasing a temperature of said propellant tank based on said evaluating step, wherein said evaluating step includes performing a pressure change rate evaluation.

2. The method of claim 1, wherein said increasing stop includes activating a heater connected to said propellant tank.

3. The method of claim 2, wherein said activating step includes setting at least one set point for the heater of said propellant tank.

4. The method of claim 1, wherein said increasing stop includes increasing the temperature of the propellant tank by an amount sufficient to achieve a desired pressure in said propellant tank.

5. The method of claim 1, wherein said at least one thruster performance parameter is at least one of a thruster on-time, power level of a power conditioning unit (PCU) said pressure of said propellant tank, and a temperature of said propellant tank.

6. The method of claim 1, further comprising:

controlling said at least one thruster to fire according to a predetermined maneuver schedule, said measuring step being performed after said controlling step.

7. The method of claim 1, wherein said evaluating step includes: performing a limit check of the pressure of said propellant.

8. The method of cliam 1, further comprising:

confirming a temperature increase of said propellant tank after said increasing step.

9. The method of claim 1, further comprising:

introducing a re-pressurization gas into said propellant tank, wherein said temperature increase and re-pressurization gas cause said propellant tank to be re-pressurized to a desired level.

10. A method for controlling a propulsion system of a spacecraft, said propulsion system including a propellant tank connected to at least one thruster, said method comprising:

measuring at least one thruster performance parameter;

evaluating said at least one thruster performance parameter to determine an indication of pressure in said propellant tank; and increasing a temperature of said propellant tank based on said evaluating step, wherein said evaluating step includes performing a maneuver length evaluation.

11. The method of claim 10, wherein said increasing step includes activating a heater connected to said propellant tank.

12. The method of claim 11, wherein said activating step includes setting at least one set point for the heater of said propellant tank.

13. The method of claim 10, wherein said increasing step includes increasing the temperature of the propellant tank by an amount sufficient to achieve a desired pressure in said propellant tank.

14. The method of claim 10, wherein said at least one thruster performance parameter is at least one of a thruster on-time, power level of a power conditioning unit (PCU), said pressure of said propellant tank, and a temperature of said propellant tank.

15. The method of claim 10, further comprising:

controlling said at least one thruster to fire according to a predetermined maneuver schedule, said measuring step being performed after said controlling step.

16. The method of claim 10, wherein said evaluating step includes: performing a limit check of the pressure of said propellant.

17. The method of claim 10, further comprising:

confirming a temperature increase of said propellant tank after said increasing step.

18. The method of claim 10, further comprising:
introducing a re-pressurization gas into said propellant tank,
wherein said temperature increase and re-pressurization gas cause said propellant tank to be re-pressurized to a desired level.

19. A method for controlling a propulsion system of a spacecraft, said propulsion system including a propellant tank connected to at least one thruster, said method comprising:
measuring at least one thruster performance parameter;
evaluating said at least one thruster performance parameter to determine an indication of pressure in said propellant tank; and
increasing a temperature of said propellant tank based on said evaluating step,
wherein said evaluating step includes:
performing an orbit determination; and
conducting a trend analysis on said at least one thruster performance parameter to determine an indication of pressure in said propellant tank.

20. The method of claim 10, wherein said trend analysis includes:
performing a specific impulse analysis.

21. The method of claim 10, wherein said trend analysis includes:
performing a plume analysis; and
performing a velocity increment analysis.

22. The method of claim 19, wherein said increasing step includes activating a heater connected to said propellant tank.

23. The method of claim 22, wherein said activating step includes setting at least one set point for the heater of said propellant tank.

24. The method of claim 19, wherein said increasing step includes increasing the temperature of the propellant tank by an amount sufficient to achieve a desired pressure in said propellant tank.

25. The method of claim 19, wherein said at least one thruster performance parameter is at least one of a thruster on-time, power level of a power conditioning unit (PCU), said pressure of said propellant tank, and a temperature of said propellant tank.

26. The method of claim 19, further comprising:
controlling said at least one thruster to fire according to a predetermined maneuver schedule, said measuring step being performed after said controlling step.

27. The method of claim 19, further comprising:
confirming a temperature increase of said propellant tank after said increasing step.

28. The method of claim 19, further comprising:
introducing a re-pressurization gas into said propellant tank,
wherein said temperature increase and re-pressurization gas cause said propellant tank to be re-pressurized to a desired level.

29. A system for controlling a propulsion system of a spacecraft, comprising:
a propellant tank;
a heater connected to said propellant tank;
at least one sensor which measures a thruster performance parameter; and
a processor which evaluates said at least one thruster performance parameter to determine an indication of pressure in said propellant tank, and which issues a control signal to activate said heater in order to increase a temperature of said propellant tank based on said indication of pressure wherein the processor determines the indication of pressure in said propellant tank by performing a pressure change rate evaluation.

30. The system of claim 29, wherein said thruster performance parameter is one of a thruster on-time, a power level of a power conditioning unit (PCU), a pressure of said propellant tank, and a temperature of said propellant tank.

31. The system of claim 29, wherein said processor is located on the spacecraft.

32. The system of claim 29, wherein said processor is located at a ground station.

33. The system of claim 29, further comprising:
are-pressurization tank which introduces a fluid into said propellant tank under control of said processor.

34. A system for controlling a propulsion system of a spacecraft, comprising:
a propellant tank;
a heater connected to said propellant tank;
at least one sensor which measures a thruster performance parameter; and
a processor which evaluates said at least one thruster performance parameter to determine an indication of pressure in said propellant tank, and which issues a control signal to activate said heater in order to increase a temperature of said propellant tank based on said indication of pressure, wherein the processor performs a maneuver length evaluation to determine the indication of pressure in said propellant tank.

35. The system of claim 34, wherein said thruster performance parameter is one of a thruster-on-time, a power level of a power conditioning unit (PCU), a pressure of said propellant tank, and a temperature of said propellant tank.

36. The system of claim 34, wherein said processor is located on the spacecraft.

37. The system of claim 34, wherein said processor is located at a ground station.

38. The system of claim 34, further comprising:
are-pressurization tank which introduces a fluid into said propellant tank under control of said processor.

39. A system for controlling a propulsion system of a spacecraft, comprising:
a propellant tank;
a beater connected to said propellant tank;
at least one sensor which measures a thruster performance parameter; and
a processor which evaluates said at least one thruster performance parameter to determine an indication of pressure in said propellant tank, and which issues a control signal to activate said heater in order to increase a temperature of said propellant tank based on said indication of pressure, wherein the processor determines the indication of pressure in the propellant tank by performing an orbit determination and conducting a trend analysis on said at least one thruster performance parameter.

40. The system of claim 39, wherein said trend analysis includes:
performing a specific impulse analysis.

41. The system of claim 39, wherein said trend analysis includes:
    performing a plume analysis; and
    performing a velocity increment analysis.

42. The system of claim 39, wherein said thruster performance parameter is one of a thruster-on-time, a power level of a power conditioning unit (PCU), a pressure of said propellant tank, and a temperature of said propellant tank.

43. The system of claim 39, wherein said processor is located on the spacecraft.

44. The system of claim 39, wherein said processor is located at a ground station.

45. The system of claim 39, further comprising:
    are-pressurization tank which introduces a fluid into said propellant tank under control of said processor.

* * * * *

UNITED STATES PATENT AND TRADEMARK OFFICE
CERTIFICATE OF CORRECTION

PATENT NO. : 6,755,378 B2
DATED : June 29, 2004
INVENTOR(S) : Ronald Capozzi et al.

It is certified that error appears in the above-identified patent and that said Letters Patent is hereby corrected as shown below:

<u>Title page,</u>
Item [73], Assignee, should read -- SES Americom, Inc., Princeton, NJ (US) --

Signed and Sealed this

Twenty-eighth Day of December, 2004

JON W. DUDAS
*Director of the United States Patent and Trademark Office*